United States Patent
Caballero Guirado et al.

(10) Patent No.: US 9,845,054 B2
(45) Date of Patent: Dec. 19, 2017

(54) REAR-VIEW MIRROR ASSEMBLY FOR MOTOR VEHICLES

(71) Applicant: FICO MIRROS, S.A., Barcelona (ES)

(72) Inventors: Adolfo Caballero Guirado, Barcelona (ES); Miguel Ángel Gómez Castilla, Barcelona (ES); José Manuel Espinosa Morales, Barcelona (ES)

(73) Assignee: FICO MIRRORS, S.A., Barcelona (ES)

( * ) Notice: Subject to any disclaimer, the term of this patent is extended or adjusted under 35 U.S.C. 154(b) by 213 days.

(21) Appl. No.: 14/940,524

(22) Filed: Nov. 13, 2015

(65) Prior Publication Data

US 2016/0137131 A1   May 19, 2016

(30) Foreign Application Priority Data

Nov. 14, 2014 (EP) .................................... 14193145

(51) Int. Cl.
*G02B 7/182* (2006.01)
*B60R 1/06* (2006.01)
(Continued)

(52) U.S. Cl.
CPC ................ *B60R 1/06* (2013.01); *B60R 1/076* (2013.01); *B60R 1/083* (2013.01); *B60R 1/12* (2013.01); *B60R 2001/123* (2013.01)

(58) Field of Classification Search
CPC .. B60R 1/06; B60R 1/083; B60R 1/12; B60R 2001/123; B60R 1/08; B60R 1/076; B60R 1/074; B60R 1/0617; B60R 1/07
(Continued)

(56) References Cited

U.S. PATENT DOCUMENTS 4,523,735 A     6/1985  Beck et al.
7,815,324 B2 *  10/2010 Sakata .................... B60R 1/076
                                                                248/478
(Continued)

FOREIGN PATENT DOCUMENTS

EP      1561642 A1    8/2005
GB      2041857 A     9/1980

OTHER PUBLICATIONS

Extended European Search Report for EP14193145 issued by European Patent Office, Berlin, Germany dated Jun. 19, 2015.

*Primary Examiner* — Euncha Cherry
(74) *Attorney, Agent, or Firm* — Peter B. Scull; Hamilton, DeSanctis & Cha LLP

(57) ABSTRACT

A mirror base, a mirror housing rotatable to the mirror base between a non-driving retracted position and a driving protracted position around an axis (X), a non-metallic spring for providing an axial spring force between the mirror base and the mirror housing whose force differs at least between the non-driving retracted and the driving protracted positions; and a first guide portion for contacting a first contact area of the non-metallic spring, and a second guide portion for contacting a second contact area of the non-metallic spring. The guide portions are configured such that, during rotation of the mirror housing to the mirror base, at least one deformable portion of the non-metallic spring between the first and second contact areas is deformed in a direction (Y) substantially perpendicular to the mirror rotation axis (X).

11 Claims, 3 Drawing Sheets

(51) Int. Cl.
*B60R 1/076* (2006.01)
*B60R 1/08* (2006.01)
*B60R 1/12* (2006.01)

(58) Field of Classification Search
USPC .................................................. 359/871, 872
See application file for complete search history.

(56) References Cited

U.S. PATENT DOCUMENTS

| | | |
|---|---|---|
| 2004/0218296 A1 | 11/2004 | Van Stiphout |
| 2005/0168855 A1 | 8/2005 | Fanelli et al. |
| 2006/0285236 A1 | 12/2006 | Huprikar et al. |
| 2008/0204912 A1 | 8/2008 | Ekenhorst |

\* cited by examiner

REAR-VIEW MIRROR ASSEMBLY FOR MOTOR VEHICLES

The present disclosure relates to rear-view mirror assemblies for motor vehicles and more specifically to adjustable rear-view mirror folding assemblies for motor vehicles both of the power and manual type, that is, motor or manually operated rear-view mirror assemblies.

BACKGROUND

Rear-view mirror folding assemblies usually comprise a mirror housing or bracket, a mirror element to be attached to the mirror housing, and a mirror base to be fixedly connected to a motor vehicle, usually to the motor vehicle body.

The mirror housing is rotatably mounted on the mirror base such that it can be arranged in at least two stable positions, namely, a non-driving retracted position and a driving protracted position.

A shaft is also arranged within the mirror housing. The shaft usually has a lower end that is fixedly coupled to the mirror base and an opposite upper end that is provided with a radially protruding flange, although an inverted shaft configuration is also possible. The mirror housing can be rotated to the mirror base around said shaft. The geometric axis of the shaft will be referred herein to as mirror rotation axis. In the forthcoming, reference will be made to the usual configuration of the shaft with a lower end fixedly coupled to the mirror base and with an upper end having a radially protruding flange.

Known rear-view mirror folding assemblies are also usually provided with a metal compression spring. Such compression spring is arranged surrounding the above mentioned shaft. A lower end of the metal compression spring is arranged resting on the mirror base while an opposite upper end of the metal compression spring is arranged abutting on the above mentioned radially protruding flange of the shaft. The metal compression spring thus acts between the mirror housing and the mirror base.

A number of teeth are formed in the mirror base. Said teeth are adapted for cooperating with corresponding teeth formed in the mirror housing when in use. Both the teeth in the mirror base and the teeth in the mirror housing define inclined planes. The inclined planes, in cooperation with the compression spring, provide a mechanical resistance against an inadvertent folding of the mirror housing relative to the mirror base between said at least two stable positions, namely the above mentioned non-driving retracted and driving protracted positions. For example, during travelling of the vehicle, where the mirror housing is positioned in the driving protracted position so as to provide a vehicle driver a substantially rearward field of view, an inadvertent folding from said driving protracted position towards the non-driving retracted position could occur due to conditions such as wind, braking, inertia, door closing, etc.

When the mirror housing is rotated relative to the mirror base around the mirror rotation axis the teeth of the mirror base and the teeth of the mirror housing move to each other. During such relative movement, the respective inclined planes of said teeth cause the mirror housing to be raised or lowered relative to the mirror base depending on the direction of rotation of the mirror housing and the mirror base. Downward movement of the mirror housing relative to the mirror base as it is rotated causes the mirror housing to move towards the mirror base compressing the compression spring. In this movement of the mirror housing towards the mirror base the compression spring opposes rotation of the mirror housing for determining its relative angular positions. Upward movement of the mirror housing relative to the mirror base as it is rotated in the opposite direction causes the mirror housing to move away from the mirror base releasing the compression spring.

The use of metal compression springs has been found to involve a number of undesirable disadvantages in known rear-view mirror folding assemblies. Metal compression springs are relatively expensive to produce. They add extra weight to the whole assembly and, due to their helical configuration, assembly operations become difficult. In addition, metal compression springs generate unwanted noise in operation due to friction. Lubricant is therefore required for reducing operating noise which adds extra costs.

Solutions to the above mentioned disadvantages have been already proposed in the art. Documents EP1561642 and US2005168855 both disclose rear view mirror assemblies of the type described above. In said documents, the metal spring is replaced by a plastic hollow cylinder. Such hollow cylinder is provided with a number of openings formed in the side surface of the hollow cylinder. The openings are arranged to define helical strips. The purpose of the helical strips is to provide an elastic property in a direction that is parallel to the longitudinal axis of the above mentioned shaft that passes through the mirror housing, that is, the mirror rotation axis.

The purpose of the plastic hollow cylinder is to act against rotation of the mirror housing relative to the mirror base to define different angular positions of the mirror housing. Plastic hollow cylinders have a number of advantages over metal compression springs. The main advantage refers to cost savings and enhanced performance, especially as regards noise and lubrication.

However, it has been found that the use of a plastic hollow cylinder with openings defining strips has significant disadvantages. The manufacturing process of plastic hollow cylinders with openings defining helical strips is complex and costly, and gives rise to a reduced resistant section which results in weakening of the plastic cylinder itself. This in turn results in a significantly lower resistant capacity which disadvantageously limits the strength that the cylinder can resiliently resist.

SUMMARY

A rear-view mirror assembly for motor vehicles is herein disclosed. With the present rear-view mirror assembly it has been found that a very efficient operation is obtained when folded and unfolded either manually or automatically. A smoother operation is achieved at a lower cost as compared with known rear-view mirror assemblies.

The present rear-view mirror assembly comprises a mirror base and a mirror housing. The mirror base is adapted to be mounted to the motor vehicle, such as to the vehicle body, by any suitable means. Of course the mirror base could be part of the vehicle body itself. The mirror housing is rotatably mounted to the mirror base. Specifically, the mirror housing is mounted to the mirror base so that it can be selectively rotated around a mirror rotation axis according to at least two predetermined angular positions which are defined hereinbelow.

A first predetermined angular position of the mirror housing relative to the mirror base is a non-driving retracted position. In this angular position the mirror housing is arranged folded along the longitudinal axis of the vehicle such that it is generally parallel to the vehicle. This predetermined angular position of the mirror housing is commonly used for example when the vehicle is parked.

A second predetermined angular position of the mirror housing relative to the mirror base is a driving protracted position. In this angular position the mirror housing is unfolded extending laterally from the vehicle. This predetermined angular position of the mirror housing is used for example when the vehicle is travelling. In this angular position a vehicle driver is provided with a substantially rearward field of view during operation of the vehicle.

Between the mirror base and the mirror housing a non-metallic spring is arranged. Such non-metallic spring is adapted for providing an axial spring force between the mirror base and the mirror housing. The axial spring force exerted by the non-metallic spring differs at least between the above mentioned non-driving retracted and driving protracted positions.

It is preferred that the non-metallic spring is an elastomeric element made from an elastic material such as rubber, polyurethane (PU), thermoplastic polyurethane (TPU), thermoplastic elastomer (TPE), ethylene propylene diene monomer (EPDM), rubber, Cellasto® commercially available from BASF, or Vulkollan® commercially available from Bayer. However, the spring may be made of any other non-metallic material suitable for being resiliently deformed as long as they can withstand temperatures ranging from −40° to 80° C. without losing its strength and while keeping the required mechanical characteristics. Different materials may however be used to withstand temperature values other than those mentioned above.

The mirror assembly comprises first and second guide portions. The first guide portion may be associated with one of the mirror housing or the mirror base and the second guide portion may be associated with other of the mirror housing or the mirror base.

The first guide portion of the mirror housing is suitably configured for contacting a first contact area of the non-metallic spring. The second guide portion of the mirror base is suitably configured for contacting a second contact area of the non-metallic spring. The first and second guide portions are adapted such that, during rotation of the mirror housing relative to the mirror base, e.g. between the above mentioned non-driving retracted position and the driving protracted position, at least one deformable portion of the non-metallic spring located between said first and second contact areas is deformed in a direction that is substantially perpendicular to the mirror rotation axis.

The direction of deformation substantially perpendicular to the mirror rotation axis causes the spring to have a very effective spring action during operation, that is, as the mirror housing is rotated relative to the mirror base, with the non-metallic spring exerting an axial spring force that is different between said different angular positions of the mirror housing. This is achieved through a cost effective solution as compared to known rear-view mirror assemblies due to material costs and manufacturing process.

The present rear-view mirror assembly may comprise a shaft around which the non-metallic spring is arranged. The mirror base may be formed integral with the shaft or it may be removably attached to the shaft.

In some particular embodiments, the first and second guide portions are configured such that, during rotation of the mirror housing relative to the mirror base, the deformable portion of the non-metallic spring is deformed in a direction outward the non-metallic spring substantially perpendicularly to the mirror rotation axis.

The above configuration with the non-metallic spring together having at least one deformable portion defined between first and second contact areas thereof, in combination with the guide portion of the mirror housing and the guide portion of the mirror base provides a low noise, efficient solution. In addition, it has been found to be very versatile as efforts involved in different rear-view mirror assemblies can be withstood with the same spring configuration.

The at least one deformable portion of the non-metallic spring between the first and second contact areas may comprise at least one of a recess or a protrusion. However, many other configurations are also envisaged, such as grooves, ribs, channels, a single groove, a single rib, a single channel or the like. Alternative configurations may be also envisaged such as annular grooves, annular ribs, annular channels or the like formed around the non-metallic spring. In practice, examples of the deformable portion of the non-metallic spring that are considered may include one or more annular recesses formed in the inner surface of the non-metallic spring, one or more annular projections formed in the outer surface of the non-metallic spring, one or more annular recesses formed in the inner surface of the non-metallic spring together with one or more annular projections formed in the inner surface of the non-metallic spring. Still in other examples, the deformable portion of the non-metallic spring may comprise curved sections resulting in a configuration of the non-metallic spring in the form of a bellows.

It is preferred that the non-metallic spring is at least substantially cylindrical in shape. However other different geometries other than cylindrical are not ruled out as long as they are non-metallic spring elements. For example, the non-metallic spring may be frustoconical in shape or it may have a variable cross-sectional shape defining, for example, a non-metallic spring in the form of a bellows as stated above. In other cases, the non-metallic spring may be a substantially annularly cylindrical element. In any case, the non-metallic spring may be adapted to be arranged surrounding at least one portion of at least one of the mirror base and the mirror housing.

The present rear-view mirror assembly may further comprise a motor. The motor may be suitably configured to provide rotation of the mirror housing around the mirror base at least between the above mentioned non-driving retracted and driving protracted positions while it is capable of compressing the non-metallic spring in operation.

A mirror pane may be received in the mirror housing for providing a substantially rear field of view to a vehicle driver when the mirror housing is positioned in the driving protracted position. In some examples, the mirror housing may be adapted for receiving a video camera. The mirror pane may be an anti-glare mirror pane, such as a mirror pane using a cell of electrically changeable optical characteristic or a mirror pane using a liquid filtering layer of variable thickness. Examples of cells of electrically changeable optical characteristic are liquid-crystal and electrochromic mirrors. In further examples, the mirror pane may further comprise a heating element. A spotter mirror may be also arranged housed in the mirror housing and positioned so as to substantially provide vision of a vehicle blind spot region to the vehicle driver when the mirror housing is positioned in the driving protracted position.

A number of additional features are also envisaged for the present rear-view mirror assembly. For example, one or more of an antenna for communicating with a radio-frequency reception system, an actuation mechanism configured to provide orientation of the mirror pane to adjust the rear field of view of the vehicle driver, an outdoor temperature sensing device configured to sense an outdoor temperature of the vehicle, one or more illumination modules and one or more optic sensor modules, may be provided in the mirror housing and/or in the mirror base.

The rear-view mirror assembly that has been disclosed provides a great number of advantages. An efficient, low noise and smooth operation when the mirror housing is rotated either manually or automatically is obtained due to reduced friction and vibrations. The provision of a non-metallic spring results in a lighter and low cost assembly that does not require the use of lubricants for ensuring a proper operation. Better recycling is also achieved as compared to metal springs.

BRIEF DESCRIPTION OF THE DRAWINGS

Non-limiting examples of the present disclosure will be described in the following. The following examples are given with reference to the appended drawings in which.

DETAILED DESCRIPTION OF EXAMPLES

Figure 1:
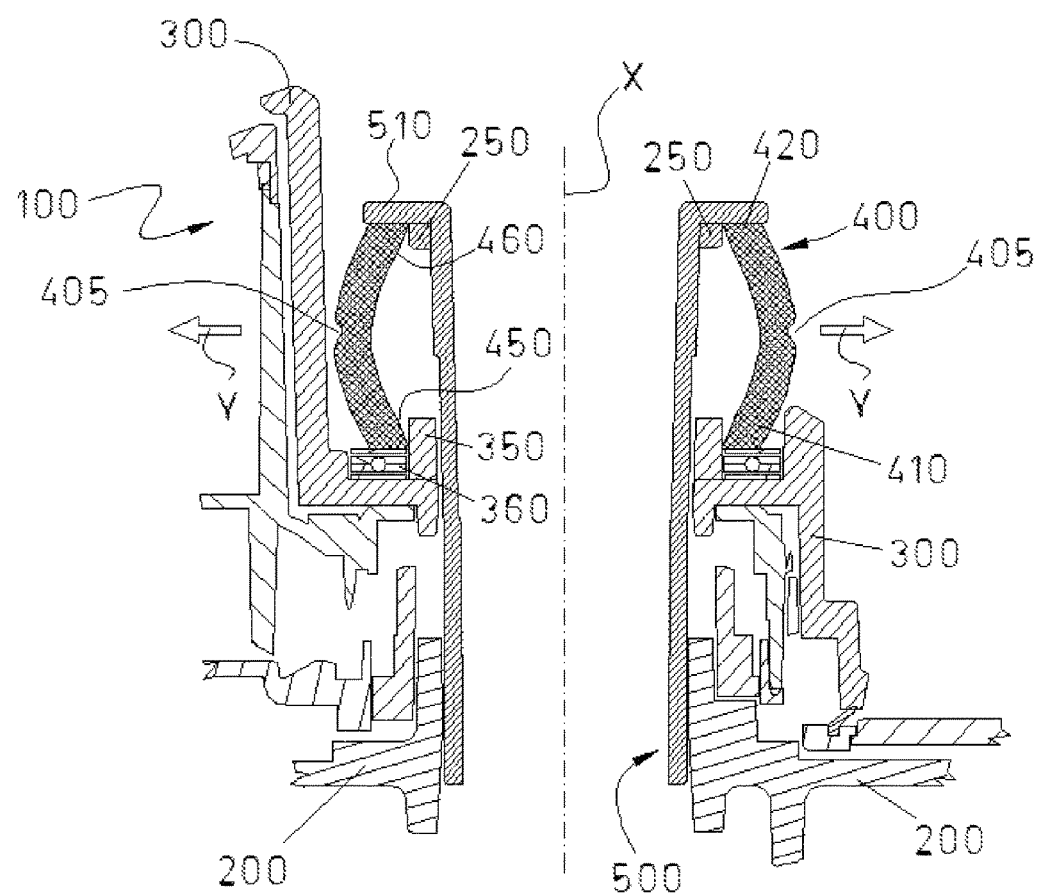
FIGS. 1-3 are cross-sectional views of three different examples of the present rear-view mirror assembly for motor vehicles.
Figure 2:
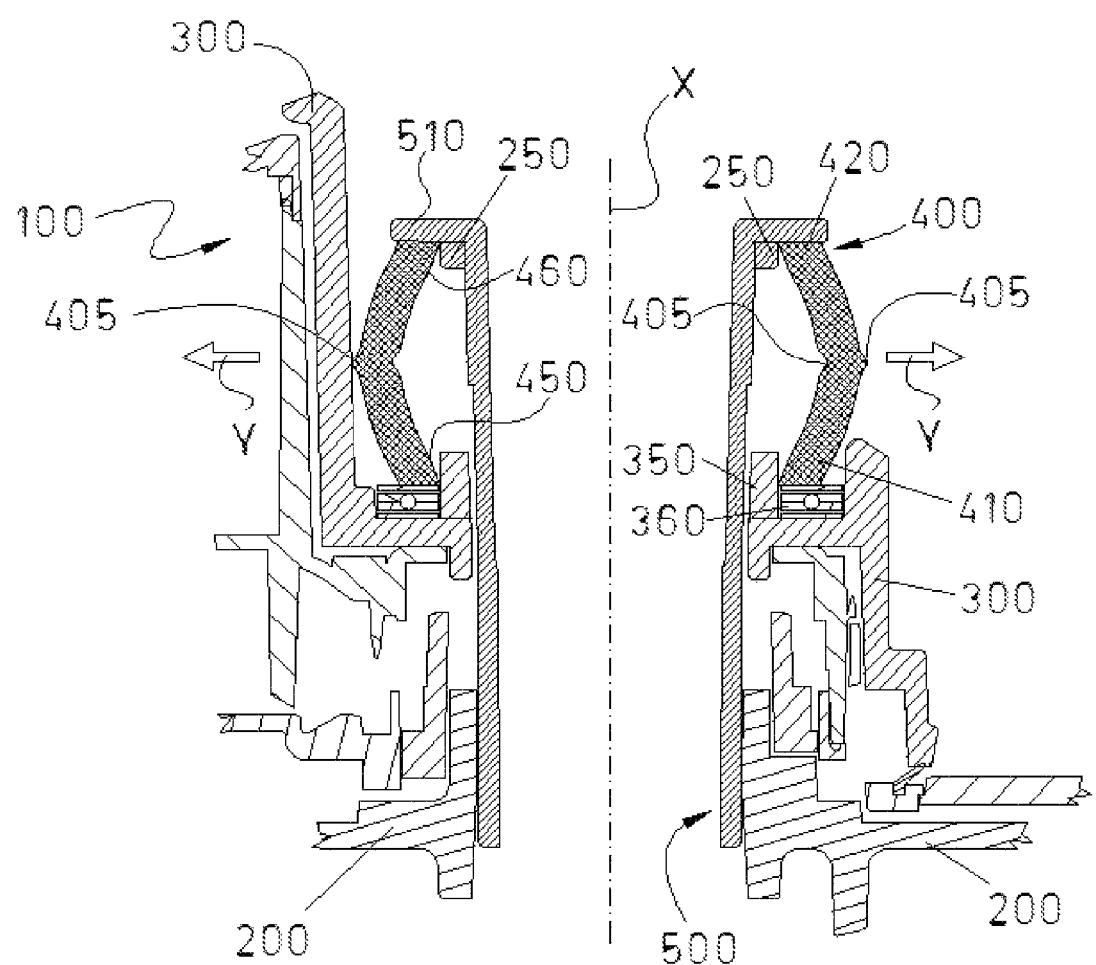
Figure 3:
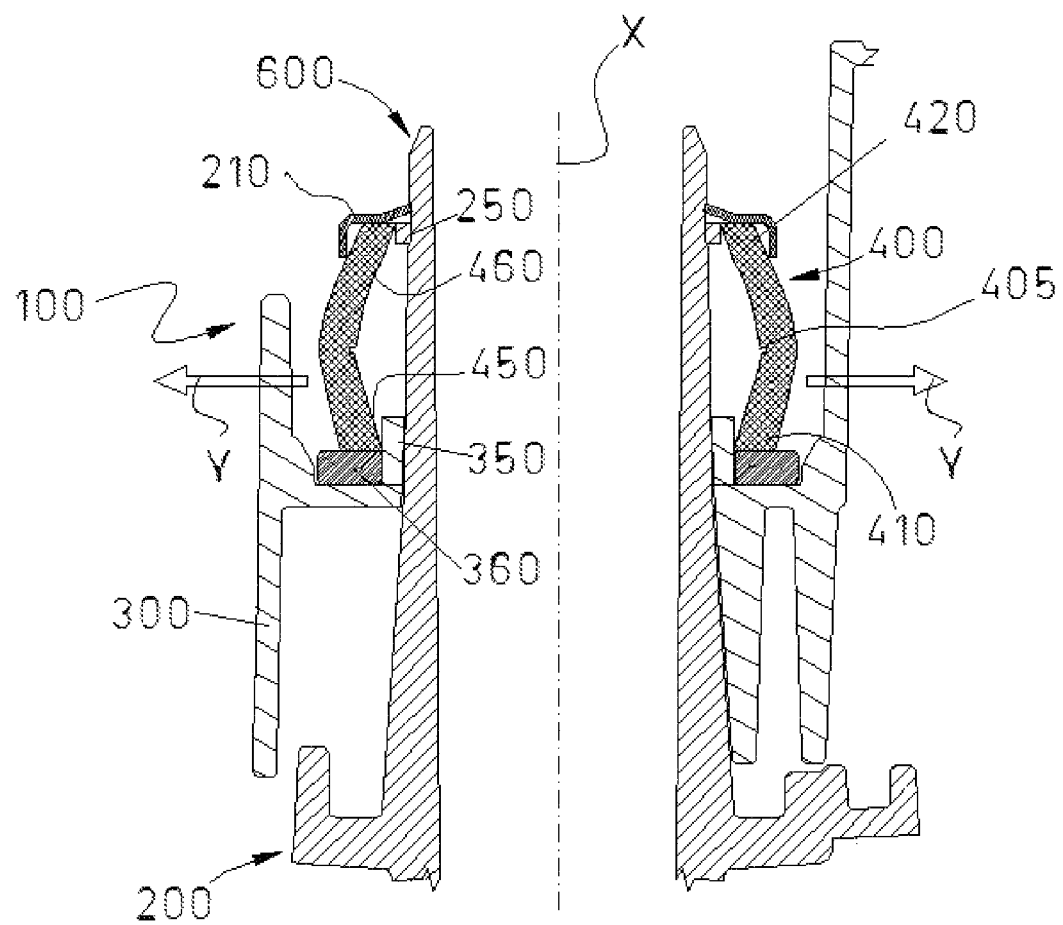

FIGS. 1 and 2 of the drawings correspond to first and second examples of the present rear-view mirror assembly for motor vehicles of the hollow shaft type also referred to as of the quarter turn lock type (also known as the "tourillon" type). FIG. 3 of the drawings corresponds to a third example of the present rear-view mirror assembly for motor vehicles referred to as of the swivel type.

Referring in general to FIGS. 1-3, the present rear-view mirror assembly 100 comprises a mirror base 200 to be mounted to the motor vehicle body (not shown) and a mirror housing 300 for receiving a mirror pane (not shown). The mirror housing 300 is rotatably mounted to the mirror base 200 such that it can be rotated around mirror rotation axis X according to at least two predetermined angular positions: a non-driving retracted position in which the mirror housing 300 is folded along the longitudinal axis of the vehicle, and a driving protracted position in which the mirror housing 300 is unfolded extending laterally from the vehicle.

A non-metallic cylindrical spring 400 made of an elastomeric material is arranged between the mirror base 200 and the mirror housing 300. The first and second examples shown in FIGS. 1-2 differ from the third example shown in FIG. 3 mainly in the constraint of the non-metallic spring 400.

In the example of the shaft type rear-view mirror assembly shown in FIGS. 1 and 2 of the drawings, the non-metallic spring 400 is arranged surrounding a shaft 500. The shaft 500 is fixedly attached to the mirror base 200, although the shaft 500 could be removably attached to the mirror base 200. The non-metallic spring 400 is arranged partially received into the mirror housing 300 as shown in the figures.

In the example of the rear-view mirror assembly of the hollow shaft type that is shown in FIGS. 1 and 2 of the drawings, the non-metallic spring 400 has a lower end 410 that is constrained by a base element 360 of the mirror housing 300 and an upper end 420 that is constrained by an upper flange 510 of the above mentioned shaft 500.

In the example of the swivel type rear-view mirror assembly shown in FIG. 3, the shaft 500 is formed integral with the mirror base. In this particular embodiment, the non-metallic spring 400 is arranged surrounding a pivot member 600 that is part of the mirror base 200. In this example, the lower end 410 of the non-metallic spring 400 is constrained by a base element 360 of the mirror housing 300 while the upper end 420 of the non-metallic spring 400 is constrained by a flange or washer 210 that is fixedly attached to an upper end of the pivot member 600.

Both examples share the arrangement of the non-metallic spring 400 between the mirror base 200 and the mirror housing 300. An axial spring force is thus imparted by the non-metallic spring 400 between the mirror base 200 and the mirror housing 300 which axial spring force differs as the mirror housing 300 is rotated. Specifically, the axial spring force imparted by the non-metallic spring 400 is different at least between the non-driving retracted and driving protracted positions of the mirror housing 300.

Also in both examples shown in the FIGS. 1-3, the mirror housing 300 has a first guide portion 350. The first guide portion 350 is configured for contacting a first contact area 450 of the non-metallic spring 400 located at a lower part thereof. On the other hand, the mirror base 200 has a second guide portion 250. The second guide portion 250 is configured for contacting a second contact area 460 of the non-metallic spring 400 located at an upper part thereof.

When the user rotates the mirror housing 300 relative to the mirror base 200, either manually of automatically, through an electric driving mechanism, a compressive stress is imparted to the non-metallic spring 400 in a direction substantially parallel to the mirror rotation axis X resulting in a bending stress of the non-metallic spring 400. The force imparted by the non-metallic spring 400 opposes rotation of the mirror housing 300 relative to the mirror base 200.

The non-metallic spring 400 has a deformable portion 405 formed between the first and second contact areas 250, 350. The guide portions 250, 350 are arranged such that the deformable portion 405 of the non-metallic spring 400 is deformed according to a perpendicular direction outward the non-metallic spring 400, as indicated by arrow Y in the drawings, when it is pressed by the mirror housing 300 when it is moved towards the mirror base 200 as it will be explained further below.

Controlled deformation of the deformable portion 405 of the non-metallic spring 400 is caused by the movement of the mirror housing 300 towards the mirror base 200. This occurs as the mirror housing 300 is rotated relative to the mirror base 200 due to the slippage of the inclined planes of the teeth in the mirror base 200 (not shown) over corresponding inclined planes of the teeth formed in the mirror housing 300 (not shown).

The guide portions 250, 350 in both examples in FIGS. 1-2 and 3, respectively, are configured such that the deformable portion 405 of the non-metallic spring 400 is deformed in a direction that is substantially perpendicular to the mirror rotation axis X outward the non-metallic spring 400, as indicated by the above mentioned arrow Y.

The deformation of the spring deformable portion 405 in the outward direction provides a very effective spring action as the mirror housing 300 is rotated relative to the mirror base 200. This is advantageously achieved with reduced costs due to manufacturing process and material costs.

Two examples of different deformable portions 405 of the non-metallic spring 400 are shown in FIGS. 1-3.

In FIG. 1, the deformable portion 405 of the non-metallic spring 400 comprises an annular groove formed in an outer surface of the non-metallic spring 400. The annular groove shown in FIG. 1 defining the deformable portion 405 is viewed as a recess in the cross-sectional area of the non-metallic spring 400.

In FIG. 2, the deformable portion 405 of the non-metallic spring 400 comprises an annular protrusion or rib formed in an outer surface of the non-metallic spring 400 projecting outwards, and a corresponding annular groove formed in an inner surface of the non-metallic spring 400. The annular protrusion or rib and the annular groove shown in FIG. 2 defining the deformable portion 405 are viewed as recesses and projections, respectively, in the cross-sectional area of the non-metallic spring 400.

In FIG. 3, the deformable portion 405 of the non-metallic spring 400 comprises an annular groove formed in an inner surface of the non-metallic spring 400. The annular groove shown in FIG. 3 defining the deformable portion 405 is viewed as a recess in the cross-sectional area of the non-metallic spring 400.

Although only a number of examples have been disclosed herein, other alternatives, modifications, uses and/or equivalents thereof are possible. For example, the non-metallic spring has been disclosed therein as deformable in a direction outward the non-metallic spring. However, there might be cases where the non-metallic spring may be deformable in a direction inward the non-metallic spring. On the other hand, the bending shape of the non-metallic spring when deformed may be either convex or concave. In addition, the deformable portion of the non-metallic spring may comprise one or more recesses and one or more protrusions. It is also envisaged that the outer or the inner surface of the deformable portion of the non-metallic spring have the same configuration, i.e. one or more recesses or one or more protrusions, but the outer or the inner surface of the deformable portion may have both recesses and protrusions. Finally, dimensions of the non-metallic spring such as height, thickness, diameter, etc. as well as the dimensions of the first guide portion in the mirror housing and the second guide portion in the mirror base will be depending on the requirements and the non-metallic material selected.

Therefore, all possible combinations of the described examples of the present rear-view mirror assembly are thus covered. The scope of the present disclosure should not be limited by the above particular examples disclosed herein, but it should be determined only by a fair reading of the following claims.

The invention claimed is:

1. Rear-view mirror assembly for motor vehicles, the mirror assembly comprising:
    a mirror base adapted to be mounted to a motor vehicle;
    a mirror housing rotatably mounted to the mirror base such that the mirror housing is selectively rotatable between a non-driving retracted position and a driving protracted position around a mirror rotation axis (X);
    a non-metallic spring arranged for providing an axial spring force between the mirror base and the mirror housing, the axial spring force exerted by the non-metallic spring differing at least between the non-driving retracted position and the driving protracted position, the non-metallic spring having a first contact area and a second contact area, and at least one deformable portion of the non-metallic spring located between the first and second contact areas;
    a first guide portion for contacting the first contact area of the non-metallic spring, and a second guide portion for contacting the second contact area of the non-metallic spring,
    whereby the first and second guide portions are configured such that, during rotation of the mirror housing relative to the mirror base between the non-driving retracted position and the driving protracted position, the at least one deformable portion of the non-metallic spring located between the first and second contact areas is deformed in a direction (Y) that is substantially perpendicular to the mirror rotation axis (X).

2. Rear-view mirror assembly according to claim 1, wherein the first guide portion is associated with one of the mirror housing or the mirror base and the second guide portion is associated with other of the mirror housing or the mirror base.

3. Rear-view mirror assembly according to claim 1, further comprising a shaft around which the non-metallic spring is arranged.

4. Rear-view mirror assembly according to claim 3, wherein the mirror base is formed integral with the shaft.

5. Rear-view mirror assembly according to claim 3, wherein the mirror base is removably attached to the shaft.

6. Rear-view mirror assembly according to claim 1, wherein said at least one deformable portion of the non-metallic spring between the first and second contact areas comprises at least one of a recess and a protrusion.

7. Rear-view mirror assembly according to claim 6, wherein at least one of the recess and the protrusion is formed in at least one of an inner surface and an outer surface of the non-metallic spring.

8. Rear-view mirror assembly according to claim 1, wherein the non-metallic spring is at least substantially cylindrical in shape and adapted to be arranged surrounding at least one portion of at least one of the mirror base and the mirror housing.

9. Rear-view mirror assembly according to claim 1, wherein the first and second guide portions are configured such that, during rotation of the mirror housing relative to the mirror base between the non-driving retracted position and the driving protracted position, the deformable portion of the non-metallic spring is deformed in a direction (Y) outward relative to the non-metallic spring.

10. Rear-view mirror assembly according to claim 1, wherein the non-metallic spring is an elastomeric element.

11. Rear-view mirror assembly according to claim 1, further comprising at least one of:
    (i) an illumination module;
    (ii) an optic sensor module;
    (iii) a motor configured to provide rotation of the mirror housing around the mirror base between the non-driving retracted and the driving protracted positions;
    (iv) a mirror pane housed in the mirror housing and positioned so as to provide a substantially rear field of view to a vehicle driver when the mirror housing is positioned in the driving protracted position;
    (v) an anti-glare mirror pane housed in the mirror housing and positioned so as to provide a substantially rear field of view to a vehicle driver when the mirror housing is positioned in the driving protracted position;
    (vi) a mirror pane housed in the mirror housing and positioned so as to provide a substantially rear field of view to a vehicle driver when the mirror housing is positioned in the driving protracted position and comprising a heating element;
    (vii) a spotter mirror housed in the mirror housing and positioned so as to substantially provide vision of a vehicle blind spot region to the vehicle driver when the mirror housing is positioned in the driving protracted position;

(viii) an antenna for communicating with a radio-frequency reception system;
(ix) an actuation mechanism configured to provide orientation of the mirror pane to adjust the rear field of view of the vehicle driver; and
(x) an outdoor temperature sensing device configured to sense an outdoor temperature of the vehicle.

\* \* \* \* \*